US006820139B1

(12) United States Patent
Binford et al.

(10) Patent No.: US 6,820,139 B1
(45) Date of Patent: Nov. 16, 2004

(54) METHOD AND ARCHITECTURE TO ASSOCIATE ENCLOSURE SERVICE DATA WITH PHYSICAL DEVICES ON A FIBRE CHANNEL LOOP WITH SOFT ADDRESSES

(75) Inventors: Charles Binford, Wichita, KS (US); Ruth Hirt, Wichita, KS (US); Lance Lesslie, Haysville, KS (US)

(73) Assignee: LSI Logic Corporation, Milpitas, CA (US)

( * ) Notice: Subject to any disclaimer, the term of this patent is extended or adjusted under 35 U.S.C. 154(b) by 480 days.

(21) Appl. No.: 09/645,637

(22) Filed: Aug. 24, 2000

(51) Int. Cl.[7] .............................................. G06F 3/00

(52) U.S. Cl. ...................... 710/3; 710/2; 710/3; 710/4; 710/8; 710/9; 710/31; 711/4; 711/114; 711/173

(58) Field of Search ............................. 710/3, 4, 9, 31; 711/4, 217, 211, 165, 203

(56) References Cited

U.S. PATENT DOCUMENTS

| 5,357,621 | A | * | 10/1994 | Cox ............................. 711/172 |
| 5,537,663 | A | * | 7/1996 | Belmont et al. .............. 710/17 |
| 5,628,027 | A | * | 5/1997 | Belmont ........................ 710/1 |
| 5,812,753 | A | * | 9/1998 | Chiariotti ....................... 714/6 |
| 5,835,965 | A | * | 11/1998 | Taylor et al. ................ 711/211 |
| 6,025,840 | A | * | 2/2000 | Taylor .......................... 345/790 |
| 6,058,464 | A | * | 5/2000 | Taylor .......................... 711/217 |
| 6,089,453 | A | * | 7/2000 | Kayser et al. ............. 235/383 |
| 2002/0002661 | A1 | * | 1/2002 | Blumenau et al. ......... 711/165 |

* cited by examiner

Primary Examiner—Jeffrey Gaffin
Assistant Examiner—Angel L Casiano
(74) Attorney, Agent, or Firm—Christopher P. Maiorana, P.C.

(57) ABSTRACT

An apparatus comprising one or more drive portions and a controller. The one or more drive portions may each comprise one or more drives. The controller may be configured to map correctly correlating addresses to the one or more drives.

21 Claims, 2 Drawing Sheets

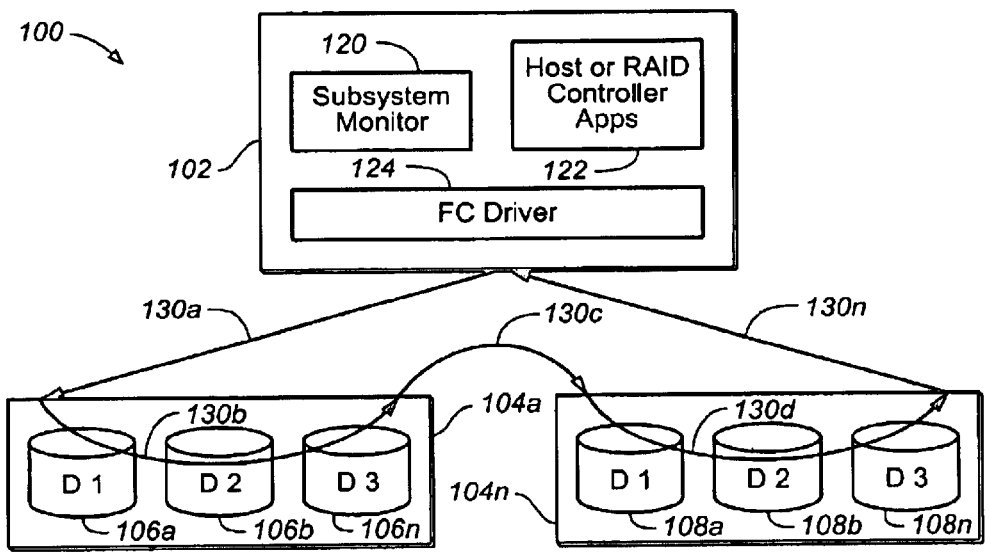
FIG._1
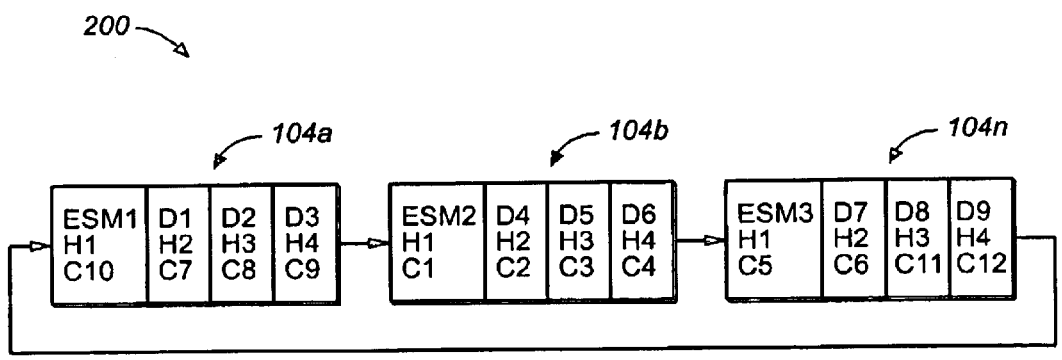
FIG._2

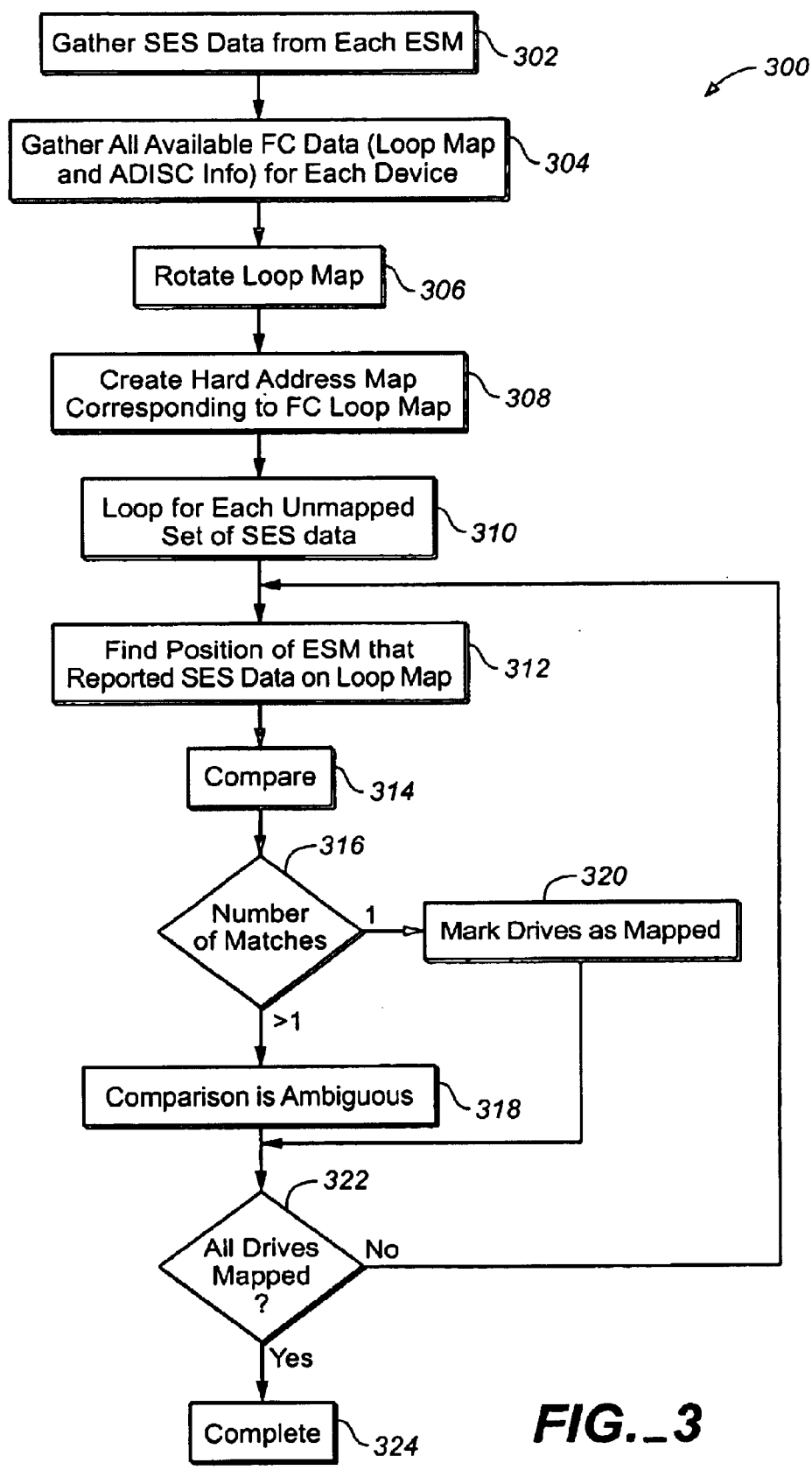
FIG._3

METHOD AND ARCHITECTURE TO ASSOCIATE ENCLOSURE SERVICE DATA WITH PHYSICAL DEVICES ON A FIBRE CHANNEL LOOP WITH SOFT ADDRESSES

FIELD OF THE INVENTION

The present invention relates to a method and/or architecture for associating devices on a loop generally and, more particularly, to a method and/or architecture for associating SCSI enclosure service (SES) data with physical devices on a fibre channel loop with soft addresses.

BACKGROUND OF THE INVENTION

In a fibre channel (FC) environment with soft addressing, correlation of the physical tray/slot location of a drive to a device discovered on the loop can be difficult. The difficulties can occur for redundant array of inexpensive disks (RAID) algorithms that can result in data integrity issues. For example, if a particular drive fails, a controller turns on a fault LED to indicate to the user which drive has failed. Turning on the correct LED is critical, since the fault LED indicates which drive to replace. To turn on the fault LED in the external drive enclosure (i.e., tray), SCSI enclosure service (SES) commands are used. Thus, a correct mapping to the SES drive slot and the FC device is required.

SUMMARY OF THE INVENTION

The present invention concerns an apparatus comprising one or more drive portions and a controller. The one or more drive portions may each comprise one or more drives. The controller may be configured to correctly map correlating addresses to the one or more drives.

The objects, features and advantages of the present invention include providing a method and/or architecture for (i) associating device (e.g., small computer system interface (SCSI)) enclosure service (SES) data with physical devices on a fibre channel loop; (ii) associating (or mapping) an enclosure service monitor (ESM) and/or a number of drives with soft addresses; and/or (iii) associating (or mapping) soft addresses that may correctly match tray and/or slot locations of a drive to a device.

BRIEF DESCRIPTION OF THE DRAWINGS

These and other objects, features and advantages of the present invention will be apparent from the following detailed description and the appended claims and drawings in which:

FIG. 1 is a block diagram illustrating a context for a preferred embodiment of the present invention;

FIG. 2 is a block diagram illustrating an operation of a preferred embodiment of the present invention; and FIG. 3 is a flow diagram illustrating an operation of the present invention.

DETAILED DESCRIPTION OF THE PREFERRED EMBODIMENTS

Referring to FIG. 1, a block diagram of a circuit (or system) 100 is shown illustrating a context for a preferred embodiment of the present invention. The system 100 generally comprises a host portion (or circuit) 102 and a number of drive portions (or circuits) 104a–104n (where n is an integer). In one example, the host circuit 102 may be implemented as a host controller of the system 100. However, the host circuit 102 may be implemented as another appropriate number and/or configuration of controller(s) in order to meet the criteria of a particular implementation. Additionally, the host circuit 102 may be required to account for (e.g., ignore) other host circuits (not shown) on a particular loop.

The drive portions 104a–104n may each be implemented, in one example, as a drive tray. The drive portion 104a is shown comprising a number of drives 106a–106n (where n is a integer). Similarly, the drive portion 104n is shown comprising a number of drives 108a–108n (where n is an integer). The number of drive portions 104a–104n, as well as the number of drives 106a–106n and 108a–108n in each drive portion may be varied accordingly to meet the design criteria of a particular implementation.

The host circuit 102 generally comprises a monitor portion 120, a host portion 122 and a driver portion 124. In one example, the monitor portion 120 may be implemented as a subsystem monitor circuit; the host circuit 122 may be implemented as a host or RAID controller application circuit; and the driver portion 124 may be implemented as a fibre channel (FC) driver portion 124. However, the monitor portion 120, the host circuit 122 and the driver portion 124 may each be implemented as other device types in order to meet the criteria of a particular implementation.

The system 100 may illustrate the subsystem monitor 120 and the FC driver 124 implemented in an application environment. A number of arrows 130a–130n may represent redundant loops between the host controller 102 and the drive portions 104a–104n. In one example, the arrows 130a–130n may represent a loop of the system 100. Additionally, a particular direction of the arrows 130a–130n may be reversed, changing the direction of the redundant loops and/or system loop 130a–130n. The loops 130a–130n may illustrate a single redundant loop of the system 100. However, the loops 130a–130n may implement other redundant loops (not shown) in order to meet the criteria of a particular implementation. The FC driver 124 generally holds information regarding the loop 130a–130n (e.g., loop map, AL_PAs, drives hard address). The subsystem monitor 120 may retain information from SCSI enclosure service (SES) data received from the drive portions 104a–104n (e.g., how many drives, slot assigned addresses, etc.). Additionally, the system 100 may allow the presumption that the SES reported order and the physical loop order of the drives 106a–106n and/or 108a–108n in the trays 104a–104n are either the same or the exact reverse order.

Data obtained from SES queries may indicate a number of drives present in each tray 104a–104n (e.g., the drives 106a–106n and/or 108a–108n). Additionally, the SES data may indicate corresponding FC hard addresses. The hard address for each of the slots is generally set via a connector on a mid-plane (not shown) of each tray 104a–104n. Each of the drives 106a–106n and/or 108a–108n may have knowledge of the hard address value by reading an appropriate hard address of the mid-plane of a current slot via an I/O port in the drive 106a–106n and/or 108a–108n.

A SES processor (of the trays 104a–104n, not shown) may acquire and/or store information regarding hard address values for each slot (e.g., drives 106a–106n and/or 108a–108n) of the trays 104a–104n. The SES processor may also return the hard address information to the host controller 102 via an SES query. Additionally, the controller 102 may obtain the hard addresses of the drives 106a–106n and/or 108a–108n via an FC extended link service (e.g., Address Discovery (ADISC)). If the controller 102 determines that all of the drives 106a–106n and/or 108a–108n on the loop 130a–130n acquire assigned hard addresses during loop initialization, then controller mapping (to be discussed in connection with FIGS. 2 and 3) from the SES data to the FC drives found on the loop 130a–130n may be trivial. For example, the controller 102 may simply match the hard addresses of the drives 106a–106n and/or 108a–108n.

Drive trays are generally manufactured such that the hard address of each drive slot is unique. Furthermore, some drive trays may have switch settings in order to set the range of hard addresses such that multiple trays may be on the same loop with no address conflicts. However, if two or more trays 104a–104n on the loop 130a–130n have the same switch setting, then the corresponding slots may have the same hard address. When the loop 130a–130n initializes the first set of drives (e.g., 106a–106n), the system may obtain hard addresses of the drives 106a–106n and the second and subsequent drives (e.g., 108a–108n, etc.) may be required to obtain "soft addresses" (e.g., addresses different than the hard addresses). The soft addresses may be implemented to prevent conflicting (e.g., duplicate) hard addresses. In such a scenario, the controller 102 may see two or more tray/slot positions with the same particular hard address value (e.g., x). Therefore, two or more drives may have the same hard address x. The system 100 is normally required to correctly match the appropriate trays/drives with allowable addresses.

The system 100 may implement proper correspondence based on the following data available to the controller 102 (i) SES data from an enclosure services monitor (ESM) that may list the number of drives installed and respective assigned hard addresses; (ii) whether or not a particular drive is bypassed from the loop 130a–130n (e.g., contained within the SES data); (iii) a loop map that may list current addresses of the trays and/or drives on the loop 130a–130n; and/or (iv) a loop order of the trays and/or drives on the loop 130a–130n.

In order for the system 100 to implement the proper correspondence, certain assumptions may be made. By designing the system 100 with the broadest assumptions, may allow multiple drive trays from multiple vendors to be accommodated. Specific knowledge of how a particular drive tray is internally wired may not be required (e.g., a relative position of the ESM to the drive or a particular direction of the loop through the tray). Therefore, the system 100 may have broad applicability. However, in a particular implementation, the present invention may leverage specific knowledge from a particular drive tray 104a–104n. An initial condition may be for each ESM to be adjacent to or in the middle of the drives 106a–106n and/or 108a–108n in a particular tray 104a–104n on the loop map.

Referring to FIG. 2, a block diagram of a method (or process) 200 illustrating an operation of the present invention is shown. The method 200 may rely on a process of elimination via a repetitive loop. For example, three drive trays 104a–104n are shown with a corresponding enclosure service monitor (e.g., ESM1, ESM2, and ESM3). A number of drives of the system 200 may be numbered D1 through D9. Each of the ESMs may comprise a number of the drives D1–D9. For example, ESM1 may comprise the drives D1–D3, ESM2 may comprise D4–D6 and ESM3 may comprise the drives D7–D9. However, a particular number of ESMs, as well as drives may be varied in order to meet the criteria of a particular implementation. The hard addresses of each of the drives D1–D9 may be labeled Hn, respectively. The drives D1–D9 may have duplicate hard addresses. A current address of each of the drives D1–D9 may be labeled Cn. Additionally, each of the ESMs may be implemented with a hard address and current address, respectively. In the case of address conflicts, the current addresses Cn of the system 200 may be rather random. The current addresses Cn may comprise a loop map obtained from the FC loop initialization processes. Each drive D1–D9 may be queried to obtain a hard address Hn and current address Cn.

A detailed description of an operation of the system 200 is described below. If the tray ESM2 is being mapped first, then a match on the hard addresses H1 may occur in both the forward direction (e.g., the drives D4, D5 and D6) and reverse direction (e.g., the drives D1, D2 and D3). In the ESM2 mapping example, the method 200 may continue until the tray ESM1 may be mapped having only one match. At that point, mapping of the tray ESM2 may allow only one match because the drives D1, D2 and D3 may be marked as already mapped. Additionally, the hard address H1 of the tray ESM3 may get a double match if mapped first. The method 200 may be initiated to notice an end of the loop. Therefore, the last ESMn may be required to associate with the last set of drives. However, a designer may have an implementation choice as to whether to merely retry the comparison ratio or implement extra logic in the comparison routine.

Referring to FIG. 3, a flow diagram of a method (or process) 300 is shown. The method 300 generally comprises a state 302, a state 304, a state 306, a state 308, a state 310, a state 312, a state 314, a decision state 316, a state 318, a state 320, a decision state 322 and a state 324. The state 302 may be a gather SES data from each ESM state. The state 304 may be a gather all available data (e.g., loop map and ADISC information) for each device state. The state 306 may be a rotate loop map state. The state 308 may be a create hard address map corresponding to FC loop map state. The state 310 may be a loop for each unmapped set of SES data state. The state 312 may be a find position of ESM that reported SES data on the loop map state. The state 314 may be a compare state. The decision state 316 may determine and respond to a number of matches of the set of hard addresses to the SES data. If the number of matches is greater than one, the comparison is ambiguous and the method 300 may continue to the state 318. If the number of matches is one, the method 300 may continue to the state 320, where all the drives are marked as mapped. The state 318 and the state 320 may continue to the decision state 322. The decision state 322 may determine if all drives are mapped. If all the drives are not mapped, the method 300 may return to the state 312. If all the drives are mapped, the method 300 may continue to the state 324. The state 324 may indicate a completion of the system 300. The state 322 may allow the system 300 to repeat the steps 312–320. The repeated steps 312–320 may allow the system 300 to provide correctly matched drives and drive tray slot positions.

A detailed description of an operation of system 300 may be as follows:

(A) in the state 302 the system 300 may gather SES data from each ESM;

(B) in the state 304 the system 300 may gather all available FC data (e.g., loop map and address discovery (ADISC) information) for each device;

(C) in the state 306 the system 300 may rotate a loop map such that the controller 102 may be at a beginning of the loop map (e.g., all drives and ESMs must follow in the loop map);

(D) in the state 308 the system 300 may create a corresponding loop map that may utilize the hard addresses of the loop devices (e.g., ESM and drives 106a–106n and/or 108a–108n). A particular hard address may be obtained via address discovery (FC extended link service);

(E) in the states 310, 312 and 314 the system 300 may find the position of the ESM that may supply the SES data on the loop map and use the loop map position as an anchor to compare the hard addresses in the SES data to the hard addresses in the loop map. The comparison may be required to be done in the forward and reverse direction (e.g., cannot assume a direction of the loop) and may account for the possibility that the ESM anchor may be at the beginning, the end, or in the middle of the group of drives for each set of SES data describing a group of drives in the tray until all the drives have been mapped. Additionally, the loop may have to be repeated several times in order to map all the drives of the various loop devices. However, when performing the compare (e.g., the compare state 314) of the SES slot ID data to the hard address version of the loop map, the system 300 may be required to logically remove the ESM device loop map. For example, if the ESM location is in a predetermined portion (e.g., a middle position) of the drives, the ESM location may corrupt the compare. The compare may be corrupted, since the ESM location is generally not accounted for in the SES drive list data; and (F) in the states 316, 318, 320 and 322 the system 300 may if only one match is found, mark the drives 106a–106n and/or 108a–108n as mapped and continue or if more than one match is found mark the comparison as ambiguous and repeat the mapping stages 312–322.

The system 300 may provide correct drive mapping by eliminating ambiguous comparison results by repeating the steps 312–322.

Conventional methods for mapping drives with soft addresses to physical tray/slot positions utilize a position of the ESM device in the loop map as a delimiter for the drive trays. However, the system 100 (200 or 300) may not assume a particular layout inside the device portions 104a–104n (e.g., is the ESM in the middle, before, or after the drives) or the loop direction within the drive portion 104a–104n. The system 100 (200 or 300) may not rely on the position of the ESM device in the loop map.

A conventional method of a physical address mapping with soft address device may be as follows:

$$\leftarrow\text{--}d1\leftarrow d2\leftarrow d3\leftarrow d4\leftarrow d5\leftarrow d6\leftarrow ESM\leftarrow d7\leftarrow d8\leftarrow d9\leftarrow d10\leftarrow\text{--},$$

where dn is a respective drive number, ESM is an arbitrary enclosure service monitor location and '←' indicates a direction of the loop. The conventional method represents the Fibre Channel (FC) order through a drive box. The conventional method may be illustrated in connection with FIG. 2. However, the conventional method will generate duplicate address matches. The conventional method will have duplicate address matches in both a forward and/or a backward direction (e.g., a first match on ESM1 or ESM2 and a second match on ESM1 or ESM2). For example, assuming that the conventional loop map is rotated in the direction of the controller (e.g., to the left), the conventional method will have a first match on ESM1 and a second match on ESM2. The conventional method assumes a particular layout of the ESM.

The system 100 (200 or 300) may, in a preferred example, have a method implemented as follows:

$$\rightarrow\text{--}d1\leftarrow d2\rightarrow d3\rightarrow d4\rightarrow d5\rightarrow d6\rightarrow d7\rightarrow d8\rightarrow d9\rightarrow d10\rightarrow ESM\text{--}\rightarrow,$$

where dn may represent a particular drive number, ESM may represent an enclosure service module location and '→' may indicate a loop map direction. The preferred method may start at an end ESM location instead of an arbitrary ESM location. The preferred method may be described in connection with FIG. 2. The EMS3 (of FIG. 2) may match addresses both a forward and a backward direction. Additionally, the preferred method may favor a match toward the start/end location ESM3 (e.g., the current addresses c5, c6, c11 and c12), since the ESM3 is at the start/end location of the loop map.

The preferred method of the present invention may have a reversed loop direction and a location of the ESM may, be moved. The preferred method may allow for variances in bypass chips (e.g., change of a particular vendor of the chip) and/or other appropriate critical circumstances. The preferred method of the system 100 (200 or 300) may allow changes in vendors of particular chips and/or critical circumstances (on the same loop). The conventional method implementing the ESM location as the delimiter, can not handle variations in chips and/or critical circumstances (such as loop direction and/or location of the ESM).

Furthermore, the system 100 (200 or 300) may be implemented to manage dual loops and bypass status of drives. The bypassed drives may be listed in the SES data as present, but do not appear on the loop map. Additionally, drives that are bypassed on a single port may appear in the loop map for a first channel, but not for a second channel. The system 100 (200 or 300) may be modified to accommodate such drives.

The system 100 (200 or 300) may be implemented to associate device (e.g., small computer system interface (SCSI)) enclosure service data with physical devices on a fibre channel loop. The system 100 (200 or 300) may associate (or map) the ESMs and/or a number of drives with soft addresses that may correctly match tray and/or slot locations of a drive to a device.

The system 100 (200 or 300) may describe an implementation in which the ESM device is an addressable SCSI device. However, the system 100 (200 or 300) may be implemented in another appropriate type implementation. For example, the system 100 (200 or 300) may be implemented when the ESM device is accessed via another SCSI device (e.g., in a pass-through manner). The fibre channel (FC) specification (e.g., the specification, SFF-8067, which is incorporated by reference in its entirety) describes such a standard for a drive to communicate with an ESM device.

In an alternate embodiment, the system 100 (200 or 300) may apply to an SFF-8067 ESM implementation. However, the method of the present invention may be required to be modified. The method may be required to implement a device (e.g., drive) queried for the SES data instead of the ESM device as the anchor on the loop map.

Additionally, the system 100 (200 or 300) may be modified to optionally implement addition information provided in a report bit in the SES data to determine which drive in the SES data reported the data. The report bit may allow the system 100 (200 or 300) to have a generally more accurate anchor in the loop map for the comparison. The system 100 (200 or 300) may be required to compare forward and backward. However, the system 100 (200 or 300) may not be required to slide the comparison back and forth.

The function performed by the flow diagrams of FIGS. 2 and/or 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   one or more drive trays each (i) comprising one or more drives and (ii) having a plurality of hard addresses each corresponding to one of said drives, wherein each of said hard addresses within each of said drive trays is separately configurable; and
   a controller configured to correctly map correlating soft addresses to each of said drives, wherein each of said soft addresses comprise unique addresses.

2. The apparatus according to claim 1, wherein said controller is configured to repeatedly map said one or more drive trays and said one or more drives.

3. The apparatus according to claim 1, wherein said controller is further configured in response to a loop map of said one or more drive trays.

4. The apparatus according to claim 3, wherein said controller is further configured to rotate said loop map such that said controller is at a predetermined stage of said loop map.

5. The apparatus according to claim 3, wherein said controller is further configured to generate said loop map in response to a first one or more addresses of said one or more drive trays.

6. The apparatus according to claim 5, wherein said controller is further configured to generate said loop map in response to a second one or more addresses of said one or more drives.

7. The apparatus according to claim 6, wherein said controller is further configured to query said one or more drive trays for data.

8. The apparatus according to claim 1, wherein said controller is further configured to find a position of an enclosure services monitor (ESM) of each of said one or more drive trays.

9. The apparatus according to claim 8, wherein said ESM is configured to provide data to said controller.

10. The apparatus according to claim 9, wherein said data comprises small computer system interface (SCSI) enclosure service data.

11. The apparatus according to claim 1, wherein said soft addresses are configured to map a tray location to one of said drives.

12. The apparatus according to claim 1, wherein said soft addresses are configured to map a slot location in said drive tray to one of said drives.

13. A method for associating data with physical devices comprising the steps of:
   (A) determining a plurality of hard addresses from a plurality of drive trays each containing a plurality of physical drives, wherein each of said hard addresses within each of said drive trays is separately configurable;
   (B) starting said association at an end device of a loop map; and
   (C) proceeding to a next device of said loop map in response to a comparison of one or more of said hard addresses to said loop map.

14. The method according to claim 13 wherein step (B) further comprises comparing said one or more hard addresses and said loop map in a forward or a reverse direction.

15. A computer readable medium configured to store instructions configured to execute the steps of claim 13.

16. A method for associating data with physical devices comprising the steps of:
   (A) determining a plurality of hard addresses from a plurality of drive trays each containing a plurality of drives, wherein each of said hard addresses within each of said drive trays is separately configurable;
   (B) starting with a first SCSI enclosure service (SES) data location;
   (C) comparing one or more of said hard addresses; and
   (D) mapping correlating said hard addresses in response to said comparison.

17. The method according to claim 16, wherein step (B) further comprises comparing in a forward or reverse direction.

18. The method according to claim 16, further comprising the step of:
   implementing said first SES data location as an anchor.

19. The method according to claim 18, further comprises:
   accounting for a state when said anchor is at a beginning, an end, or in a middle of said one or more devices.

20. The method according to claim 19, further comprises:
   if a single match is found, mark the one or more devices as mapped; or
   if more than one match is found then mark the comparison as ambiguous.

21. A computer readable medium configured to store instructions configured to execute the steps of claim 16.

* * * * *